April 21, 1953    W. FEW ET AL    2,636,138
POWER PRESS CONTROL
Filed April 22, 1946    3 Sheets-Sheet 3

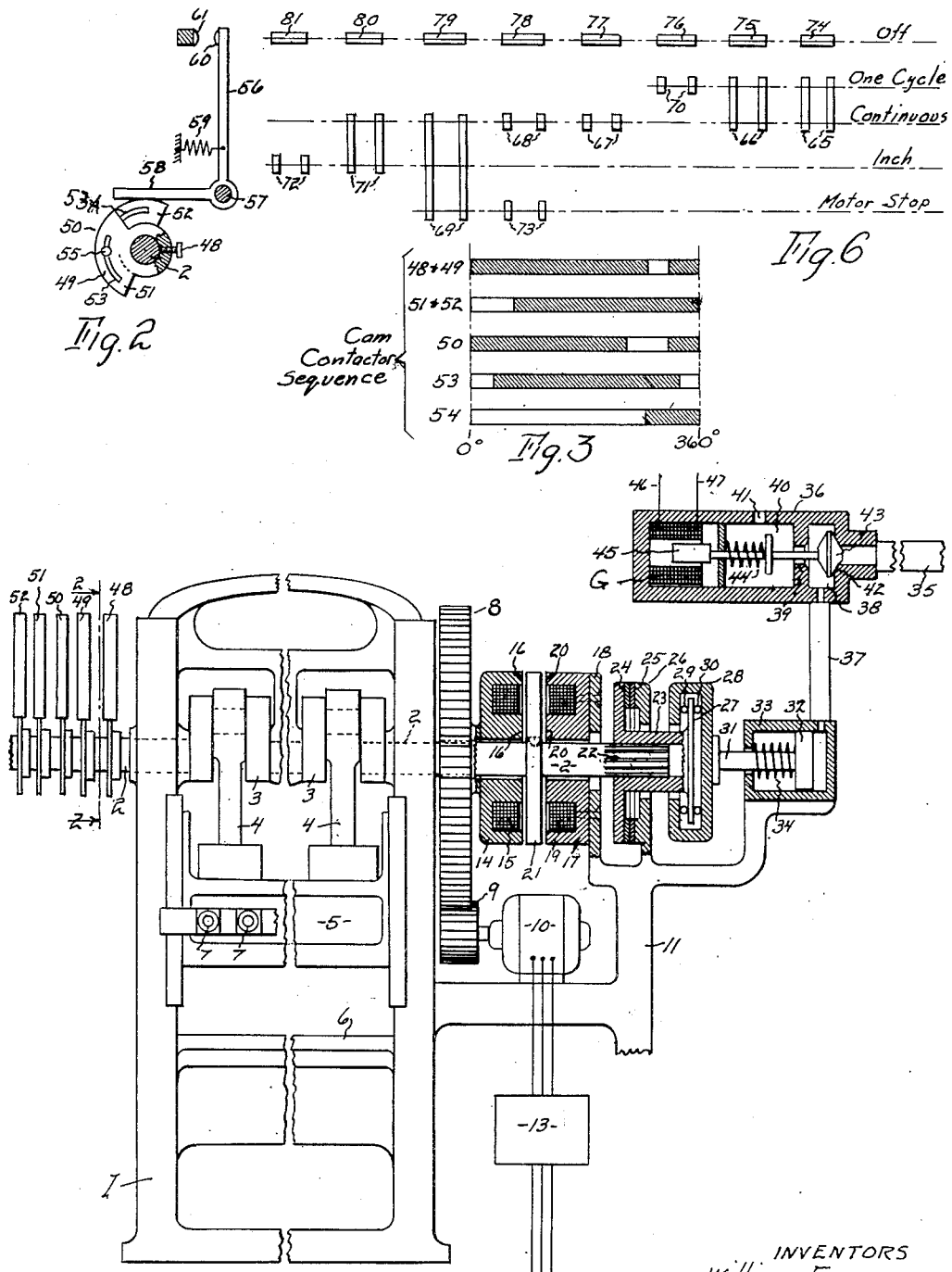

INVENTORS
William Few
Oswald M. Bundy
By Harry P. Canfield
ATTORNEY

Patented Apr. 21, 1953

2,636,138

UNITED STATES PATENT OFFICE 2,636,138

POWER PRESS CONTROL

William Few, East Cleveland, and Oswald M. Bundy, Cleveland, Ohio, assignors to The Clark Controller Company, Cleveland, Ohio, a corporation of Ohio Application April 22, 1946, Serial No. 663,938

14 Claims. (Cl. 310—93)

This invention relates to the control of motor driven cyclically operating machines illustrative of which as a general class are power presses.

In the patent to O. M. Bundy, No. 2,299,007, granted October 13, 1942, is illustrated and described a power operated press, and a control system therefor; and the present invention may be considered in some respects as an improvement over the disclosure of that patent, and reference may be made thereto.

In that patent, a continuously running electric motor supplies power for reciprocating the head of a press, and a friction clutch and a friction brake are provided, to release the brake and set the clutch to start the press, and to release the clutch and set the brake to stop the press.

In the developing of this art it has become desirable to obviate numerous known disadvantages of the said friction brake and clutch. In the present invention this has been done by utilizing a magnetic brake and clutch of the type which exerts torque through a magnetic field medium.

Such magnetic brakes and clutches are well known; and the action thereof being electrodynamic, are properly described as electrodynamic brakes and clutches; but, for simplicity hereinafter, the electrodynamic brake and clutch utilized in the present invention will be referred to as "magnetic" to distinguish them from an auxiliary "friction" brake which is also utilized.

While magnetic clutches and brakes have advantages over friction clutches and brakes in a press control, the highly inductive character of the clutch and brake windings when of a size suitable for a power operated press, introduces a disadvantage, namely, the difficulty of quickly de-energizing them to release them.

According to the present invention, the magnetic brake and clutch are energized to operate them respectively by unidirectional current rectified from alternating current supply mains, by electronic rectifier tubes; and to de-energize them quickly, they are caused to discharge, and to deliver their stored energy back to the alternating current supply mains, through the same rectifier tubes, by inversion.

The magnetic clutch is partially and intermittently energized, when it transmits power to the press for "inching" movements.

The tubes are conditioned for full power rectification to fully energize the brake and clutch to actuate them, and for inversion to de-energize and release them, and for partial clutch energization for inching, by a phase changing system for the grids of the tubes.

Emergency provision is made to de-energize and release the clutch by actually opening its energizing circuit if it has failed for any reason to be de-energized by inversion as aforesaid.

A supplemental friction brake is provided to hold the press against drifting movement when it has been stopped by the magnetic brake, or to stop it in emergencies.

Emergency provision is also made to prevent further operation of the control system upon failure of magnetic clutch or brake current.

Other features of safety for the operators and for the press and for the work in the press are provided for.

A novel control system is provided to energize the grids of the tubes and to control the phase changing system, to control the clutch and brake, under both manual control and automatic press-movement control; to start and stop and inch the press in accordance with predetermined requirements of press movement, and requirements of safety for the press operators; to bring into action the said emergency and safety provisions, etc.

Accordingly, the main objects of the invention are to provide a control system for a power press or like cyclically operating machine, having, among others, the features mentioned above.

Other objects will be apparent to those skilled in the art to which the invention appertains.

The invention is fully disclosed in the following description taken in connection with the accompanying drawing in which:

Fig. 1 is an elevational view, in some respects diagrammatic, illustrating a power press, having a magnetic clutch, a magnetic brake, and a friction brake associated therewith; a magnetically controlled valve for controlling air pressure to operate the friction brake; and showing five contactors operated by movement of the press;

Fig. 2 is a diagrammatic view of one of the press-operated contactors, the view being taken from the plane 2—2 of Fig. 1;

Fig. 3 is a diagrammatic view illustrating the operating times of the press-operated contactors during a complete cycle of the press;

Fig. 6 is a diagrammatic view illustrating a manual controller for setting the electric control circuit of Fig. 5 for different desired operating conditions.

Figure 5:
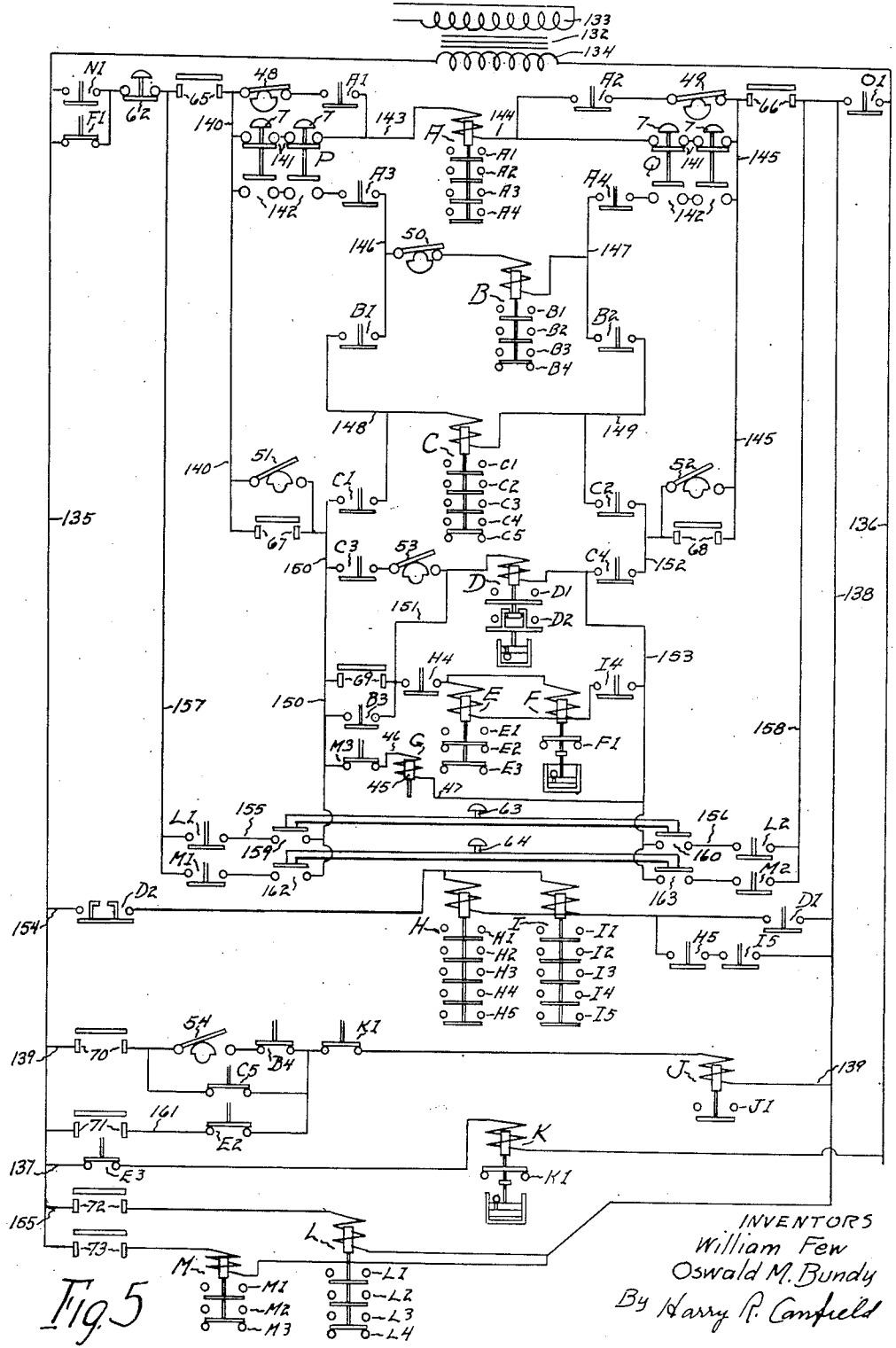
Figs. 4 and 5 are diagrammatic views and are to be considered as parts of one figure illustrating a complete control system for operating the press and controlling its operation.

Referring to the drawings, Figs. 1 and 2, I have shown generally at 1 the main base of a power operated press, having a crank shaft 2, and a pair of cranks 3—3, which operate connecting rods 4—4, to reciprocate an upper head 5, toward and from a lower stationary head 6, to perform pressing operations upon work pieces placed in dies or the like, not shown, but to be as usual mounted on the heads 5 and 6.

A revolution of the shaft 2, and a complete alternate reciprocation of the head 5, constitutes a cycle of operations of the machine, and the parts are illustrated in Fig. 1 at the beginning of the cycle, or at the top of the stroke.

Mounted adjacent to the machine or on it, is a plurality of operator's push buttons 7—7. Preferably two push-buttons are provided for each operator of the machine, although only two have been shown; and the control system to be described is arranged so that all of the operator's push-buttons must be closed before the head 5 will start downwardly, whereby the operator's hands and arms and other parts of his body will be out of the line of movement of the head 5 and therefore out of danger of injury thereby, and to this end the push buttons 7—7 may be disposed at some distance from the head 5.

A gear 8 is mounted to run idly upon the shaft 2, and is meshed with a motor pinion 9 on the shaft of a motor 10 supported on the frame 1, or on a bracket 11 thereof, and in the operation of the machine, the motor 10 runs continuously at a predetermined speed and continuously rotates the gear 8.

The motor is energized from supply mains 12 through a controller 13 by which in a well known manner it may be started and stopped or reversed.

A magnetic clutch head 14 is secured to and rotates with the gear 8 and has a clutch winding 15 housed therein and has annular pole faces 16—16.

A magnetic brake head 17 is secured to a part 18 of the stationary bracket 11 and has housed therein a brake winding 19 and has annular pole faces 20—20 confronting and spaced from the pole faces 16—16 of the clutch head.

A brake and clutch rotor 21 is keyed to the shaft 2, rotatable between the clutch head and brake head; and the diagrammatic showing indicates that torque will be exerted thereon by the clutch head 14 to rotate the shaft 2 when the clutch winding 15 is energized, and that torque will be exerted thereon by the brake head 17 to stop the shaft 2 when the brake winding 19 is energized. The energization and de-energization of the windings 15 and 19 is synchronized by means to be described.

The end of the shaft 2 projects through and outwardly beyond the magnetic brake and clutch heads and is splined as at 22, and meshed with the splines is the hub 23 of a friction-brake actuator, carrying a brake ring 24 rotatable with the hub 23 and shaft 2, opposite a stationary brake ring 25 on a part 26 of the bracket 11.

Associated with the hub 23 is a disc 27, within a housing 28 in which are mounted ball bearings 29 and 30 on both sides of the disc 20; and the housing 28 is connected to the piston rod 31 of a piston 32, reciprocable in a cylinder 33; and the piston 32 is normally held toward the right, as viewed in the drawings, by a spring 34; and the thrust of the spring is transmitted through the piston rod 31 and housing 28, and through the ball bearing 29, to the disc 27, and thence to the hub 23, and thereby holds the brake ring 24 in frictional engagement with the brake ring 25, and, acting through the splines 22, exerts a braking action on the shaft 2, to hold it from rotation or to bring it to rest, if at the time, it is rotating.

When the piston 32 is reciprocated toward the left, as viewed in the drawing, against the tension of the spring 34, the hub 23 is moved by the ball bearing 30 toward the left, on the splines 22, and disengages the brake rings 24—25.

The piston 32 is operated to move it toward the left, by air pressure from a source 35 controlled by a valve device 36. In the normal position of the parts illustrated, the cylinder 33 is exhausted through a conduit 37 to a chamber 38, through a valve port 39 to a chamber 40, and out to atmosphere at 41, and air pressure from the source 35 is cut off at a port 42, by a valve 43, held in port-closing position by a spring 44.

An electro-magnetic winding G is provided which, when energized, moves a plunger 45 to compress the spring 44 and retract the valve 43 to uncover the port 42 and close the port 39, whereupon fluid pressure from the source 35 flows through the port 42 to the chamber 38, and by conduit 37 to the cylinder 33, to move the piston against the tension of the spring 34 for the purposes described.

From the foregoing description it will now be apparent that when the electro-magnetic winding G of the valve device 36 is energized, the brake of the machine is released, and that when the winding is de-energized, the brake is set by the spring 34; and that energization of the winding G may be effected by an electric circuit comprising wires 46 and 47.

The left-hand end of the shaft 2, as viewed in Fig. 1, extends beyond the machine and has mounted thereon seven cam operated contactors 48 to 54 to be referred to later, the operation of which may be seen from the diagrammatic elevational view of one of them in Fig. 2. Only five of these cam contactors are shown in Fig. 1 to shorten the drawing. In Fig. 2, upon the shaft 2, is mounted by means of a screw 48, a cam 49, having a cam surface 50, preferably in two overlapping parts, a front part 51, and a rear part 52, having arcuate slots 53 and 53A therein respectively, through which a clamp bolt 55 is projected to lock them together. The part 51 is clamped upon the shaft 2 by the screw 48 but may be adjustably positioned around the shaft by loosening the screw and shifting the part and again tightening the screw; and the part 52 may be shifted around the shaft 2 and then secured to the part 51 by the bolt 55, whereby the extent of the cam surface 50 may be adjustably varied, as well as its angular position around the shaft 2.

A contactor arm 56 is pivotally supported at 57, and has a finger 58 engaged with the cam surface 50, by a spring 59, and the arm 56 carries a movable contact 60 opposite a stationary contact 61.

As will be apparent from this diagrammatic construction, when the shaft 2 is rotated, the cam surface 50 will leave the finger 58 and the spring 59 will close the contacts 60 and 61, and as the shaft 2 continues to rotate the finger 58 will ride up on the cam surface 50 and disengage the contacts 60 and 61.

Obviously the cam contactor of Fig. 2 may, when the shaft 2 is at the beginning of its cycle, be positioned either to cause the contacts 60 and 61 to be engaged or to be dis-engaged.

The said seven cam operated contactors 48 to 54 have been reproduced diagrammatically, in Fig. 5, which illustrates a part of the control system embodying the invention and to be more fully described later. The contactors 48, 49, and 50 are normally closed, and the contactors 51, 52, 53, and 54 are normally open; and in this figure is reproduced the valve winding G and its plunger 45, and the circuit wires 46 and 47 thereof, as well as the push-buttons 7—7.

Figure 4:
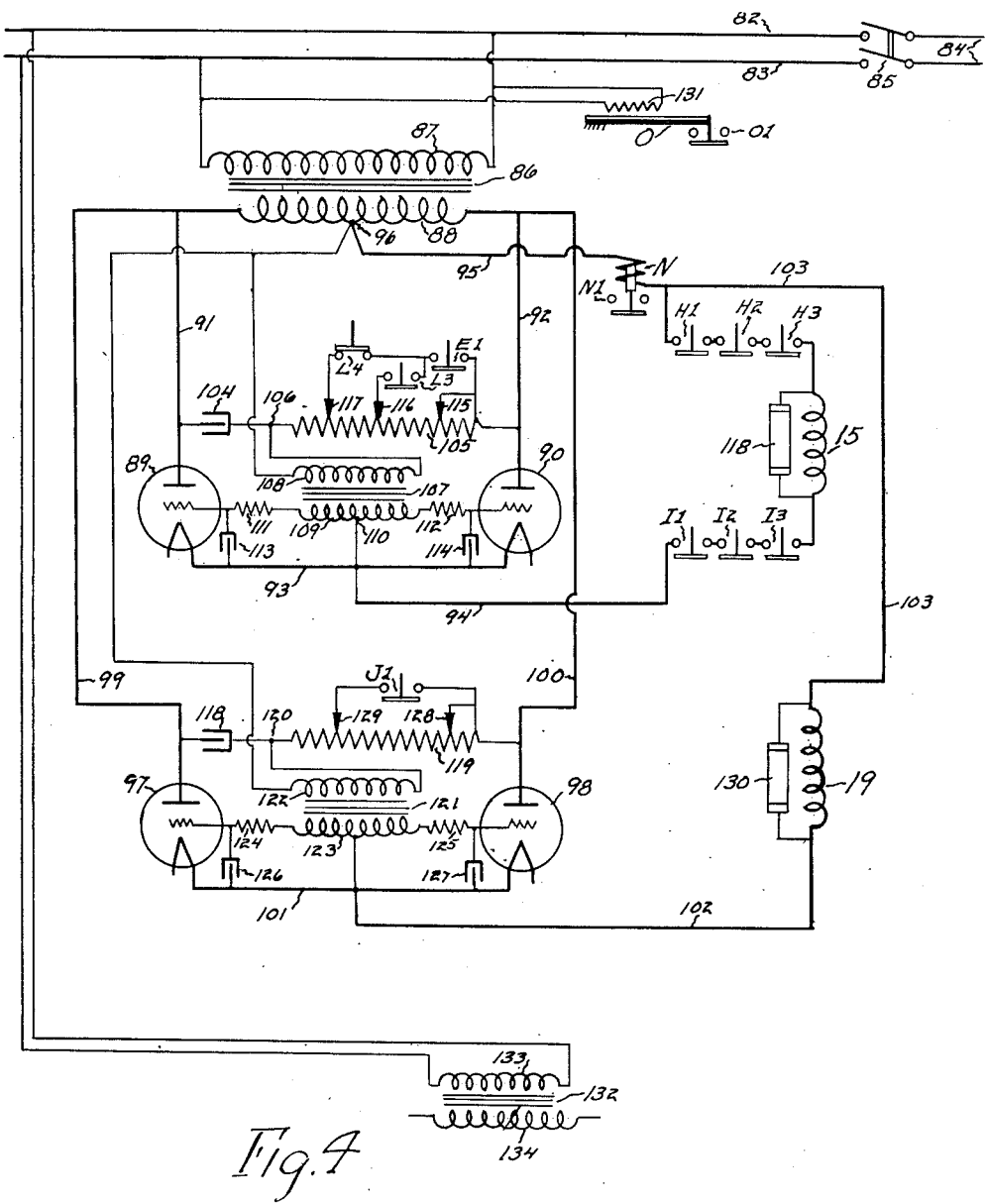

The clutch and brake windings 15 and 19, are shown in Fig. 4 to be described.

In Fig. 5, there are shown a number of electro-magnetic contactors each having a number of contacts as follows:

Contactor A having normally open contacts A1 to A4;

Contactor B having normally open contacts B1 to B3 and normally closed contacts B4;

Contactor C having normally open contacts C1 to C4 and normally colsed contacts C5;

Contactor D having normally open contacts D1 and D2;

Contactor E having normally open contacts E1 and normally closed contacts E2 and E3;

Contactor F having normally closed contact F1 arranged to open as indicated after a time interval following energization of the contactor;

The brake valve winding G referred to above;

Contactor H having normally open contacts H1 to H5;

Contactor I having normally open contacts I1 to I5;

Contactor J having normally open contacts J1;

Contactor K having normally closed contacts K1 which as indicated open after a time interval of energization of the contactor;

Contactor L having normally open contacts L1 to L3 and normally closed contacts L4;

Contactor M having normally open contacts M1 and M2 and normally closed contacts M3.

At 62 is a manual "stop" push button type contactor; at 7—7 are the said manual "start" push button type contactors; at 63 is a manual "inching" push button type contactor; and at 64 is a push button contactor for performing a retarding and stopping operation on the motor 10 of Fig. 1.

At 65 to 73 inclusive are nine pairs of contacts illustrated with bridging bars above them, to be manually opened and closed, and these are preferably all assembled in a manual controller diagrammatically illustrated in Fig. 6 where a series of bridging bars 74 to 81 may be moved from an "off" position to either of four positions designated as "one cycle," "continuous," "inch," and "motor stop"; and in each position will bridge certain pairs of the contacts 65 to 73 selectively.

The aforesaid seven cam operated contactors 48 to 54 operated by rotary movement of the press shaft have their cams adjusted so as to operate as indicated in the diagrammatic showing of Fig. 3 wherein zero degrees indicates the angular position of the shaft 2 at the top of the press stroke and 360 degrees indicates that it has made a complete revolution. The shaded zones of the diagram indicate that the contactors identified at the left of the respective zones are closed and unshaded zones indicate that they are open.

In Fig. 4, at 82—83 are alternating current supply mains which may be connected to and disconnected from a source 84 by a switch 85. A transformer 86 has a primary 87 connected to the mains 82—83 and a bi-phase secondary 88.

A rectifying circuit is provided comprising two rectifier tubes 89—90, anode-connected to the ends of the secondary 88, by wires 91 and 92 and having a common cathode main 93, connected by a wire 94 through a series of contacts I1—I2—I3 to the aforesaid magnetic clutch winding 15, and thence through a series of contacts H1—H2—H3, and through the winding of a magnetic contactor N by a wire 95 to the mid-point 96 of the bi-phase secondary 88.

Another rectifying circuit is provided comprising two rectifier tubes 97—98, anode-connected to the ends of the secondary 88 by wires 99—100 and having a common cathode main 101, connected by a wire 102 to the aforesaid magnetic brake winding 19, and thence by a wire 103 through the winding of the contactor N and by said wire 95 to the mid-point 96 of the secondary 88.

The energizing and phase changing system above referred to for the grids of the tubes 89 and 90 comprises a capacitor 104 and an adjustable resistor 105 connected across the wires 91 and 92 and therefore across the bi-phase secondary 88, with a connection point 106 therebetween, whereby alternating potential is produced between the points 96 and 106, out of phase with the potential impressed on the tubes 89—90 by the secondary 88, by an amount determined by the adjustment of the resistor 105; and a transformer 107 having a primary 108 is energized by this out of phase potential, and energizes a bi-phase secondary 109 the mid-point 110 of which is connected to the cathode main 93 and the ends of which are connected respectively to the grids of the tube 89—90; resistors 111—112 and capacitors 113—114, being provided for the usual purposes.

The resistor 105 has three adjustable taps 115—116—117 thereon, and, at any adjustments thereof, contacts L4, L3, and E1 when operated as will be described, provide three different effective values for the resistor, and thereby give three different degrees of phase displacement of the grid energization of the tubes 89 and 90.

When the contacts E1 and L4 are closed, and contacts L3 are open, the phase will be set to cause the tubes 89 and 90 to fire in the early part of the tube-impressed potential wave and supply substantially full wave rectified current to the clutch winding 15 to cause it to drive the press.

When contacts L4 are opened and contacts L3 and E1 are closed, the tubes will fire at an intermediate part of the tube impressed wave and supply reduced rectified current to the clutch winding and this is done intermittently as will be described when the press is to be operated with "inching" movements.

When the contacts E1 and L3 are both open, the phase is shifted toward the late part of the tube impressed wave. It is well known that, with a full wave tube rectifier circuit such as that here considered, and as described, and while it is being operated as a rectifier, energized from an alternating current source as described, if a sufficient direct current potential be impressed upon the rectifier output mains, and the grid phase of the rectifier tubes be shifted sufficiently far toward the late part of the tube impressed wave, the rectifying action is "inverted"; and the direct potential and current become the input, and are converted into alternating potential and current and supplied back as output to the alternating current source.

In the present instance, the clutch winding 15 is energized across the mains 94—95 with unidirectional current by the rectifier as described; and it is highly inductive as stated.

If then the potential impressed upon it be suddenly reduced to a low value, it will rapidly discharge in a well known manner and it thereby becomes a source of unidirectional potential impressed on the mains 94—95.

When the phase on the tube grids was shifted toward the late part of the tube impressed wave as referred to by opening the contacts E1 and L3, this not only reduced the impressed rectified potential on the clutch winding 15 to a very low value causing it to discharge, but also, as aforesaid, conditioned the tubes for inverter action.

Thus when the contacts E1 and L3 are both opened, the energization of the clutch winding 15 discharges back into the alternating current mains without rupturing the clutch winding circuit; and the clutch energization dies out to a negligible value; and without being retarded or delayed, and therefore in the minimum of time.

It has been found that a magnetic clutch of sufficient size to operate a power press is so highly inductive that it cannot be de-energized quickly and safely by simply opening its circuit by rupturing contacts, because the potential induced by its decaying magnetic field rises to destructive values, and arcs at the rupturing contacts form and persist, even if a plurality of circuit rupturing contacts are provided in series; and the time required to release the clutch is thereby made too long for satisfactory reliable operation of a rapidly moving, cyclically operating press. By utilizing rectifier tube inversion as above described these defects of such clutches when used with power presses are obviated, and rapid, safe, on and off cycles of operation are made possible; and the energy stored in the clutch winding is supplied back as useful energy into the current source system.

In some cases, it may be desirable to supplement the inversion action of de-energizing the clutch winding by bridging it with a unit of a material having resistance which decreases with the potential impressed upon it, and such a unit is shown at 118 connected across the clutch winding 15. Such material is well known in commerce by those skilled in the art.

The double series of contacts I1, I2, I3, and H1, H2, H3 referred to above, at each side of the clutch winding 15 are provided as safety emergency contacts. Normally they are open until the clutch is to be energized, and then close and remain closed in the operation of the control system (as will be described); but if due to any cause the clutch winding 15 should not become de-energized by inversion as provided for in the operation of the system, these contacts will all open simultaneously and rupture the clutch winding circuit, so that the press cannot continue to be driven unexpectedly and with danger to the operators and damage to work in the press upon failure of the inversion circuit.

A phase changing system similar to that for the tubes 89—90, is provided for the tubes 97—98, and can be briefly described. It comprises a capacitor 118 and a resistor 119 and an intermediate point 120; a transformer 121 having a primary 122 connected across the points 96 and 120, and energizing a bi-phase secondary 123 midconnected to the cathode main 101, and its ends are connected to the grids of the tubes 97—98 with the usual resistors 124—125 and capacitors 126—127.

Two adjustable taps 128—129 are provided on the resistor 119; and at any adjustment, contacts J1 when operated (as will be described) provide two effective values for the resistor 119, and two degrees of phase displacement for the grids of the tubes 97 and 98 to cause them to have two values of potential output. The operation is similar to that of the tubes 89—90.

When the contacts J1 are closed, the phase will be set to supply full wave rectified current through the tubes 97—98 to the magnetic brake winding 19. When the contacts J1 are open, the phase is shifted to cause the tubes 97—98 to effect by inversion, and discharge of the inductive brake winding, and supply of its energy back to the mains 82—83.

The foregoing comments as to the de-energizing of the inductive clutch winding 15 apply also to the de-energizing of the inductive brake winding 19; and the advantages provided by the quick safe release of the clutch also are provided by the quick release of the brake. A unit, such as that at 118 for the clutch winding 15, is provided at 130 for the brake winding 19 for a like purpose.

If for any reason the brake fails to be released by the inverting action of the tubes 97—98, no danger results as in the case of clutch release failure as referred to, and disconnecting contacts such as those provided in the clutch winding circuit are not needed.

A time interval relay O is provided having contacts O1 which remain open for a time interval after closing the supply switch 85. Any suitable type of relay for this purpose may be provided, that shown representing a thermal relay having bi-metal heated by a heater 131 energized across the mains 82—83.

The purpose of this relay is to prevent starting up of the system upon closure of the line contactor 85, and consequent passing of substantial current through the tubes 89—90 to the clutch winding 15 until these tubes have had time to heat up.

This is done, as will be described, by preventing the contacts I1 to I3 and H1 to H3 from closing to close the clutch winding circuit, until contacts O1 have closed.

A like time delay protection is provided but in a different manner for the tubes 97—98. The grid phase changing contacts J1 for these tubes are normally open, and cannot close (as will be described) until the relay contacts O1 have closed, and with the contacts J1 open, the grid phase is shifted so far toward the late firing part of the tube impressed wave that the tubes 97—98 cannot pass destructive current, even if not heated up.

The contactor N having its winding in series with the main current to brake winding 19 and clutch winding 15, has its contacts N1 disposed (as will be described) to close a holding circuit for energizing the control system, and if the main current to the clutch and brake windings should fail, the contacts N1 open and restore the system to a safe condition.

At 132 is a transformer having a primary 133 connected across the mains 82—83 and having a secondary 134, for supplying potential to the part of the control system of Fig. 5.

Various elements and circuit connections not hitherto described will now be described in connection with a description of operation of the whole system.

In the operation of the press and press control it will first be assumed that it is to start from the top of the press stroke and make one complete stroke or one cycle, thus returning to the top, and then stop.

Cam contactors 48 and 49 and 50 of Fig. 5 are therefore in closed position (see Fig. 3). The manual controller of Fig. 6 is moved to the "one cycle" position, closing contact pairs 65, 66, 70 reproduced in Fig. 5 the others remaining open.

The motor 10 is started and idly drives the gear 8.

When the line switch 85 of Fig. 4 is closed, the transformer 132 of Fig. 4 is energized, and by means of its secondary 134 (reproduced in Fig. 5) supplies potential to control mains 135 and 136.

There is only one closed circuit between these mains, namely, that at 137, the other cross circuits of the diagram being between main 135 and a main 138 but the latter is at present de-energized because of contacts O1 in the upper right hand corner of the diagram which are open awaiting operation of the contactor O of Fig. 4. The current flows through the cross circuit 137 through closed contacts E3 and through the winding of contactor K and its closed contacts K1 will, after a time interval, open. This time interval is short, say five seconds, as compared with a time interval of sixty seconds for the thermal relay contacts O1.

Closed contacts K1 are in cross line 139.

Contacts O1 finally close energizing mains 135—138.

Current now flows from main 135, through contacts F1 (upper left corner of Fig. 5) through closed "stop" contactor 62, closed contacts 65, to wire 140 to the "start" contactors 7—7.

These push button contactors 7—7 of which four are shown, will, when depressed, start up the control system. They are disposed in two groups, P and Q, and any desired number may be provided in each group, preferably two for each operator. For well known reasons as set forth in the aforesaid patent, it is desirable that all of these contactors be released and returned to their upper positions before starting up the cycle. These contactors therefore have normally closed upper contacts 141—141 and normally open lower contacts 142—142.

When all the contactors 7—7 are released, current flows from wire 140 by way of contacts 141 of group P, wire 143, winding of contactor A, wire 144, contacts 141 of group Q, wire 145, closed contacts 66, contacts O1, to main 136; and contactor A operates closing its contacts A1 to A4.

Current then flows from wire 140 by way of contacts 48, A1, wires 143 and 144, contacts A2, 49, to wire 145, thus holding contactor A operated independently of the push button contactors 7—7 which may now be depressed.

When contactors 7—7 are depressed, closing contacts 142—142, current flows from wire 140 by way of contacts 142 of group P, contacts A3, wire 146, contacts 50, winding of contactor B, wire 147, contacts A4, contacts 142 of group Q to wire 145; and contactor B operates closing contacts B1 to B3 and opening contacts B4.

Current then flows from wire 146 by way of contacts B1, wire 148, winding of contactor C, wire 149, contacts B2 to wire 147, operating contactor C and closing its contacts C1 to C4, and opening C5.

Current then flows from wire 148 by way of contacts C1 to wire 150, contacts B3, wire 151, winding of contactor D, contacts C4, wire 152, contacts C2, to wire 149; and contactor D operates closing contacts D1 and D2.

Upon closure of contacts C4, wire 153 became energized; and the magnetic valve winding G thereupon became energized from wire 150, by way of contacts M3, wires 46 and 47, to wire 153; and this, in Fig. 1, operates the valve 43 and causes the friction brake discs 24—25 to be moved apart by the piston 32 to release this brake.

When contacts D1—D2 closed, they closed a cross line 154, Fig. 5, from main 135 to main 138, energizing the windings of contactors H and I and closing their contacts H1 to H5 and I1 to I5.

Contactors E and F are thereupon energized, from wire 150 by way of contacts B3, H4, windings of contactors E and F, contacts I4, to wire 153, and they operate, closing contacts E1 and opening contacts E2, E3 and, after a time interval, opening contacts F1.

When contacts E1 closed (see Fig. 4), the grids of tubes 89—90 were phased to pass full current to the clutch winding 15; and since contacts I1 to I3 and H1 to H3 were synchronized as described to be already closed, the clutch is fully energized to start the press cycle.

The clutch current in winding of contactor N (Fig. 4) operates it, and it closes its contacts N1, which in Fig. 5 (upper left) take over the control current, substituting for contacts F1 which may now be opened, to put the control on series contactor N as referred to, as a protection against clutch current failure. This occurs immediately upon energization of contactors E and F but contacts F1 do not open until after a time delay as indicated to give time for the current in the clutch circuit to build up and close contacts N1.

Referring to cross line 139, Fig. 5, contacts K1 were opened by contactor K as described before potential came on main 138; so that contactor J could not operate. When contactor E operated it opened contacts E3 in cross line 137, de-energizing contactor K, and its contacts K1 closed; but in the meantime, in cross line 139, contactor J was withheld from operating by opening of contacts C5, so that the full brake winding current is held off by open contacts J1 in Fig. 4. The brake winding 19 will be receiving a very small rectified current, see Fig. 4, because of the "inversion" setting of the point 128 on the resistor 119, but this is ineffective and does no damage to the tubes 97—98 even if they are not warmed up when it starts to flow, upon closure of line contactor 85.

Upon energization of the clutch winding 15 as described, through the agency of contacts E1 upon closing, the press starts its cycle.

After a part of the down stroke of the press, cam contactors 51 and 52 close (see also Fig. 3), and then the start contactors 7—7 can be released; contactor C being held operates by current from wire 140 by way of contacts 51, C1, C2, and 52 to wire 145.

This de-energizes contactor B and opens contacts B3 upon which energization of contactors D, E, and F depended, but does not affect these contactors, because, prior to this as indicated in Fig. 3, cam contacts 53 closed, which maintains contactor D energized between wires 140 and 145 by way of contacts 51, C3, 53, C4, and 152, and contactors E and F energized by way of 53, 151, H4, I4, and 153.

Cam contacts 51 and 52 will open again at the top of the stroke, see Fig. 3, to restore the control system for another operation.

When the press reaches the end of its cycle or the top of its return stroke, it is desired to de-energize the clutch by inversion that is, in Fig. 4, by de-energizing contactor E, Fig. 5, to open contacts E1, Fig. 4; and to energize the brake, that is, by energizing contactor J, Fig. 5, to close contacts J1, Fig. 4.

The clutch will be put on inversion to de-energize it by deenergizing contactor E upon opening of cam contacts 51—52 at the top of the stroke, see Fig. 3, but preferably it is de-energized earlier, by opening of cam contacts 53, see Fig. 3.

The brake can be energized by operation of contactor J and closure of contacts J1, by cam contactor 51 at the top of the stroke which opens and de-energizes contactor C, and it closes contacts C5 in cross line 139, contacts K1 being closed; but preferably it is energized earlier by closure of cam contactor 54, in cross line 139, contacts B4 and K1 being closed.

When contactor E was de-energized to discharge the clutch by inversion as described, contactor F was also de-energized and moved to open its contacts D1 and D2. As indicated, in Fig. 5, diagrammatically, contacts D1 open at once, but opening of contacts D2 is delayed. Upon opening of contacts D1, energization of contactors H and I (which have contacts I1 to I3 and H1 to H3 in series with the clutch winding 15) is maintained on their own holding contacts H5 and I5 in cross line 154, Fig. 5. After a time interval for discharging of the clutch winding, contacts D2 open, and then contacts I1 to I3 and H1 to H3 open the clutch circuit for purposes referred to.

The brake winding 19 will be discharged by inversion when contacts J1 open again upon de-energizing contactor J, and this occurs at the top of the stroke when cam contacts 54 open.

When cam contactors 51—52 open as referred to, at the top of the press stroke, they remove potential from the wires 150 and 153, and the friction brake controlling winding G is de-energized and as described for Fig. 1, this brake sets to hold the press from drifting by gravity; or if for any reason, such as failure of the control to function as described, the magnetic brake does not stop it, this brake will.

The magnetic brake when fully energized is effective to stop the press from continuing to operate. It is true that the torque of a magnetic brake such as here utilized dies out when the relative movement of the braked parts approaches zero. But there is always considerable friction in the moving parts of a press of large size for which a magnetic brake and clutch are advantageous, as referred to above, and when the magnetic brake has effectively stopped the press, friction will bring it to dead rest. The friction brake is utilized primarily to hold the press at rest, and to prevent it from moving by itself if at the time of being stopped it is in an unbalanced condition and gravity might propel it.

It is in this aspect that the magnetic brake is described and claimed herein as effective to stop the press when it is fully energized.

When it is desired to have the press run continuously cycle after cycle, the manual controller of Fig. 6 is moved to the "Continuous" position, and contacts at 65, 66, 67, 68, 69, 71, reproduced in Fig. 5, will be closed and the others open.

The cam contactors 51—52 are now bridged by the controller contacts 67 and 68 and their above described action is inhibited so that a momentary closure of the start contactors 7—7, sets the control into operation as described above, and it repeats, stroke after stroke of the press.

To stop the press, the stop contactor 62 is manually depressed cutting off potential from the control system by cutting off main 135, and this, as will be understood from the foregoing description, will set the friction brake by de-energizing the valve winding G, Fig. 5; and set the magnetic clutch tubes 89—90 to inversion by opening contacts E1, to deenergize the clutch; and cause contactor J to operate (it being energized across the mains 135 and 138—136 independently of the stop contactor) and close contacts J1 and energize the magnetic brake.

When it is desired to operate the press by "inching" movement, as when setting up dies in the machine for example, the manual controller, Fig. 6, is set to the "Inch" position closing contacts 69—71—72, reproduced in Fig. 5.

The controller contacts 72 close a cross line 155, Fig. 5, energizing and operating contactor L which closes contacts L1, L2, L3, and opens contacts L4. In Fig. 4, contacts L3 and E1 set the grid phase of tubes 89—90 for an intermediate value of rectified clutch current suitable for inching purposes, whenever contacts E1 close.

Contacts L1 and L2 are respectively in short lines 155—156 connected to wires 157—158, receiving potential from the mains 135—136 independently of the start contactors 7—7 and the automatic response thereto.

The said inching push button type contactor 63 when depressed closes contacts 159—160 which connects the wires 157—158 to the described wires 150—153, and energizes them independently of the contactors A, B, and C and of the cam contactors 51—52.

Controller contacts 69 being closed, each time the push button 63 is depressed, the friction brake will be released by energization of winding G. Contactor D will be operated, and contacts D1 and D2 will cause operation of contactors H and I, and contacts H4 and I4 will cause operation of contactors E and F. Contacts E1 (Fig. 4) will close and provide intermediate inching clutch current as referred to; and contacts E3 and E2 open cross lines 137, and a branch cross line 161, contacts 71 being closed. Controller contacts 70 being now open, the only circuit for contactor J controlling the brake winding is through 71—E2.

The press runs so long as the push button 63 is held depressed. When it is released, it de-energizes friction brake winding G to set the friction brake; and causes E1 to open and discharge the clutch winding; and causes contacts E2 to close. Contacts E2 cause contactor J to operate and close contacts J1, which as described cause energization of the magnetic brake. Thus long or short inching movements are provided for as desired.

In any event, and as described, whenever the press is stopped by the magnetic brake, upon operation of contactor J and closure of contacts J1 (Fig. 4), contacts E3 in cross line 137 will be closed.

This energizes contactor K across mains 135—136 and it starts a time interval at the end of which it opens contacts K1 in cross line 139, de-energizing contactor J and opening contacts J1, which, as shown for Fig. 4, conditions the brake winding for discharging by inversion as described.

In Fig. 1, the motor 10 runs continuously in one direction for the above described operations. In setting up the press, for example during inching operations, it is sometimes desirable to quickly stop the motor and run it in the reverse direction. The motor 10 could be stopped and reversed by the controller 13, but because of the inertia of the idle gear 8 and clutch housing 14 this would cause the motor 10 to draw a damaging amount of current from the line 12. Also, and as contemplated within the scope of our invention, a well known belt drive may be substituted for the illustrated gear drive between the motor 10 and clutch housing 14, and a sudden plugging reversal of such drives is objectionable.

It is therefore desirable in some cases to quickly bring the motor 10 to rest before reversing it and means will now be described for utilizing the magnetic clutch for this alternative purpose.

The motor 10 is first disconnected from the line 12 by the controller 13.

The manual controller, Fig. 6, is set to the "Motor Stop" position, closing contacts 73 and 69 reproduced in Fig. 5.

Closed contacts 73 connect contactor M across mains 135 and 138 and it operates closing contacts M1, M2, and opening contacts M3.

The brake actuating winding G is cut off by contacts M3 so that the friction brake 24—25 sets.

The push button type contactor 64 is now depressed manually closing contacts 162—163, and this connects the wire 157 to the wire 159 through contacts M1 and 162, and connects wire 158 to wire 153 through contacts M2 and 163.

The contacts 69 being closed, contactors D, H, I, and E operate (as during inching by the push button contactor 63) and the clutch winding 15 is fully energized when E1 closes. The rotor 21 on the shaft 2 is held stationary by the friction brake 24—25 and the torque developed by the rotating clutch housing 14, quickly brings it and the gear 8, pinion 9, and motor 10 to rest.

The contactor 64 is then released, and the motor started up in the reverse direction by the controller 13.

To stop the motor quickly in the reverse direction preparatory to starting it again in the forward direction, the same procedure is followed.

The invention is not limited in all respects, to the details illustrated and described herein; changes and modifications may be made; and the invention comprehends all changes and modifications which come within the scope of the appended claims.

We claim:

1. An electric control for a power operated cyclically operating machine of the type comprising a continuously running motor for supplying power to the machine; a power transmission element rotatable idly by the motor when the machine is at rest; a magnetic clutch energizable effectively to clutch the transmission element to the machine to drive it; a magnetic brake energizable effectively to brake the machine to stop it; the control comprising a source of alternating current; a first tube rectifying and tube grid phase changing system for energizing the magnetic clutch effectively from the source by rectified current and discontinuing effective energization by inversion; a second tube rectifying and tube grid phase changing system for effectively energizing the magnetic brake from the source by rectified current and discontinuing effective energization by inversion; a control system comprising contacts and circuits controlled thereby which when electrically actuated control the first grid phase system to cause effective energization of the magnetic clutch as aforesaid; and which, when de-actuated control the first grid phase system to cause discontinuance of effective energization of the magnetic clutch as aforesaid, and control the second grid phase system to cause effective energization of the magnetic brake and after a time interval discontinuance of effective energization thereof as aforesaid; and control contacts controlling actuation and de-actuation of the said circuits.

2. An electric control for a power operated cyclically operating machine of the type comprising a continuously running motor for supplying power to the machine; a power transmission element rotatable idly by the motor when the machine is at rest; a magnetic clutch energizable effectively to clutch the transmission element to the machine to drive it; a magnetic brake energizable effectively to brake the machine to stop it; friction brake for the machine biased to set condition and having electrically actuable means to release it; the control comprising a source of alternating current; a first tube rectifying and tube grid phase changing system for energizing the magnetic clutch effectively from the source by rectified current and discontinuing effective energization by inversion; a second tube rectifying and tube grid phase changing system for effectively energizing the magnetic brake from the source by rectified current and discontinuing effective energization by inversion; a control system comprising contacts and circuits controlled thereby which when electrically actuated effect release of the friction brake by its electrically actuable means and control the first grid phase system to cause effective energization of the magnetic clutch as aforesaid; and which, when de-actuated allow the friction brake to set and control the first grid phase system to cause discontinuance of effective energization of the magnetic clutch as aforesaid, and control the second grid phase system to cause effective energization of the magnetic brake and after a time discontinuance of effective energization thereof as aforesaid; and control contacts controlling actuation and de-actuation of the said circuits.

3. An electric control for a power operated cyclically operating machine of the type provided with a magnetic clutch, and a magnetic brake; the control comprising a source of alternating current; a first grid controlled tube rectifying system for the magnetic clutch; a second grid controlled tube rectifying system for the magnetic brake; grid phase changing systems for the respective rectifying system; contacts controlling the phase changing systems to cause the magnetic clutch to be energized with rectified current from the source effectively to drive the machine; and to cause discontinuance of effective energization by inversion; and to cause the magnetic brake to be energized with rectified current from the source effectively to stop the machine; and discontinuance of effective energization thereof by inversion; and control means to control the said contacts to effect in sequence; effective energization of the magnetic clutch to start the machine; discontinuance of effective energization of the magnetic clutch and effective energization of the magnetic brake to stop the machine; and discontinuance of effective energization of the magnetic brake.

4. An electric control for a power operated cyclically operating machine provided with a magnetic clutch, and a magnetic brake, and a friction brake biased to set condition and provided with magnetic means and means controlled thereby when energized to release the brake; the control comprising a source of alternating current; a first grid controlled tube rectifying system for the magnetic clutch; a second grid controlled tube rectifying system for the magnetic brake; grid phase changing systems for the respective rectifying systems; contacts controlling the phase changing systems to cause the magnetic clutch to be energized with rectified current from the source effectively to drive the machine; and to cause discontinuance of effective energization thereof by inversion; and to cause the magnetic brake to be energized with rectified current from the source effectively to stop the machine; and to cause discontinuance of effective energization thereof by inversion; and contacts controlling energization of the friction brake magnetic means; and control means to control the said contacts to effect in sequence; energization of the brake magnetic means and release of the friction brake and effective energization of the magnetic clutch to start the machine; discontinuance of effective energization of the magnetic clutch and effective energization of the magnetic brake and de-energization of the brake magnetic means and setting of the friction brake to stop the machine; and discontinuance of effective energization of the magnetic brake.

5. An electric control for a power operated cyclically operating machine of the type provided with a magnetic clutch, and a magnetic brake; the control comprising a source of alternating current; a first grid controlled tube rectifying system for the magnetic clutch; a second grid controlled tube rectifying system for the magnetic brake; grid phase changing systems for the respective rectifying systems; contacts controlling the phase changing systems to cause the magnetic clutch to be energized with rectified current from the source effectively to drive the machine; and to cause discontinuance of effective energization thereof by inversion; and to cause the magnetic brake to be energized with rectified current from the source effectively to stop the machine; and discontinuance of effective energization thereof by inversion; and control means to control the said contacts to effect in sequence; energization of the magnetic clutch effectively to start the machine; discontinuance of effective energization of the magnetic clutch and effective energization of the magnetic brake to stop the machine; and discontinuance of effective energization of the magnetic brake; and the control means comprising optionally operable means to control the contacts of the phase changing system of the first grid controlled tube rectifying system, to cause the magnetic clutch to be energized effectively with reduced current.

6. An electric control for a power operated cyclically operating machine of the type provided with a magnetic clutch, and a magnetic brake, and a friction brake biased to set condition and provided with magnetic means and means controlled thereby when energized to release the brake; the control comprising a source of alternating current; a first grid controlled tube rectifying system for the magnetic clutch; a second grid controlled tube rectifying system for the magnetic brake; grid phase changing systems for the respective rectifying systems; contacts controlling the phase changing systems to cause the magnetic clutch to be energized with rectified current from the source effectively to drive the machine; and to cause discontinuance of effective energization thereof by inversion; and to cause the magnetic brake to be energized with rectified current from the source effectively to stop the machine; and discontinuance of effective energization thereof by inversion; and contacts controlling energization of the friction brake magnetic means; and control means to control the said contacts to effect in sequence; energization of the brake magnetic means and release of the friction brake and energization of the magnetic clutch effectively to start the machine; discontinuance of effective energization of the magnetic clutch and effective energization of the magnetic brake and de-energization of the brake magnetic means and setting of the friction brake to stop the machine; and discontinuance of effective energization of the magnetic brake; and the control means comprising optionally operable means to control the contacts of the phase changing system of the first grid controlled tube rectifying system, to cause the magnetic clutch to be energized effectively with reduced current.

7. An electric control for cyclically operating machines of the type provided with a magnetic clutch, and a magnetic brake; the control comprising a source of alternating current; electrical means to energize the magnetic clutch and brake from the source with rectified current effectively to respectively drive and brake the machine and to discontinue effective energization of the magnetic brake and clutch and discharge their stored magnetic energy back into the alternating current source as alternating current; control means to control the said electrical means to effect in sequence; effective energization of the magnetic clutch; discontinuance of effective energization of the magnetic clutch and effective energization of the magnetic brake and discontinuance of effective energization of the magnetic brake.

8. An electric control for cylically operating machines of the type provided with a magnetic clutch, and a magnetic brake, and a friction brake biased to set condition and having magnetic means and means actuated by energization thereof to release it; the control comprising a source of alternating current; electrical means to energize the magnetic clutch and brake from the source with rectified current effectively respectively to drive and brake the machine, and to energize the magnetic means of the friction brake with alternating current and to discontinue effective energization of the magnetic brake and clutch and discharge their stored magnetic energy back into the alternating current source as alternating current; control means to control the electrical means to effect in sequence; effective energization of the magnetic clutch; and release of the friction brake by energization of the magnetic means; discontinuance of effective energization of the magnetic clutch and effective energization of the magnetic brake and setting of the friction brake by de-energization of the magnetic means and discontinuance of effective energization of the magnetic brake.

9. An electric control for cyclically operating machines of the type provided with a magnetic clutch, and a magnetic brake; the control comprising a source of alternating current; electrical means to energize the magnetic clutch and brake from the source with rectified current effectively respectively to drive and brake the machine, and to discontinue effective energization of the magnetic brake and clutch and discharge their stored magnetic energy back into the alternating current source as alternating current; control means to control the electrical means to effect in sequence; effective energization of the magnetic clutch; discontinuance of effective energization of the magnetic clutch and effective energization of the magnetic brake and discontinuance of effective energization of the magnetic brake, the control means comprising optionally effective means to cause the magnetic clutch to be energized effectively with reduced current.

10. In an electric control for a power operated machine, a source of current, a motor continuously driven by current from the source, a power transmission element rotatable idly by the motor when the machine is at rest, a magnetic clutch, a clutch control to energize the clutch for clutching the transmission element to the machine to drive the machine by motor transmitted power, and for de-energizing the clutch; brake means to stop the machine and hold it at rest with the clutch de-energized; a motor control for disconnecting the motor from the source and for subsequently reversing it; the clutch control comprising means to energize the clutch while the machine is held at rest, to bring the transmission element and disconnected motor to rest preparatory to reversing the motor.

11. In an electric control for a power operated machine, a source of current, a reversible motor driven by source current, a rotary transmission element; a magnetic clutch, which when energized couples the element to the machine to transmit motor power to drive the machine, the transmission element being idly rotated by the motor when the clutch is de-energized; brake means to stop the machine and hold it at rest; means to stop the motor and the idling element, preparatory to reversing the motor, when the machine is at rest, comprising means to disconnect the motor from the source and to then energize the clutch.

12. An electric control for a power operated cyclically operating machine of the type comprising a continuously running motor for supplying power to the machine, a power transmission element rotatable idly by the motor when the machine is at rest, a magnetic clutch comprising an inductive clutch winding for clutching the transmission element to the machine to drive it, and a magnetic brake comprising an inductive brake winding for braking the machine to stop it; the control comprising: a source of current; circuits for energizing the clutch and brake windings respectively from the source; electrical transmission means in the respective circuits for controlling the source potential impressed on the respective windings; an electric system comprising control circuits and actuable contacts controlling the control circuits; the said electrical transmission means being controlled by the control circuits and responsive to sequential actuation of the contacts to sequentially impress: full energizing potential on the clutch winding; reduced potential on the clutch winding and full energizing potential on the brake winding; and reduced potential on the brake winding; the reduced potentials on the windings permitting them to discharge inductively into their said winding circuits; the electrical transmission means in the respective winding circuits comprising means to supply the discharge current back to the source while maintaining the respective winding circuits uninterrupted and means for sequentially actuating the contacts.

13. An electric control for a power operated cyclically operating machine of the type comprising a continuously running motor for supplying power to the machine, a power transmission element rotatable idly by the motor when the machine is at rest, a magnetic clutch comprising an inductive clutch winding for clutching the transmission element to the machine to drive it, and a magnetic brake comprising an inductive brake winding for braking the machine to stop it; the control comprising: a source of alternating current; a first electronic tube rectifier connected to receive current from the source and supply it as unidirectional current to the clutch winding; a second electronic tube rectifier connected to receive current from the source and supply it as unidirectional current to the brake winding; an electric system comprising control circuits and actuable contacts controlling the control circuits; the output of the rectifiers being controlled by the control circuits and the rectifiers being thereby rendered responsive to sequential actuation of the contacts to impress energizing potential on the clutch winding by the first rectifier; reduced potential on the clutch winding by the first rectifier and energizing potential on the brake winding by the second rectifier, and reduced potential on the brake winding by the second rectifier; the reduced potentials on the windings being at a value at which the windings discharge inductively into the respective rectifiers; and the rectifiers being responsive to act as inverters, and supply the discharge current back to the source; and means for sequentially actuating the contacts.

14. An electric control for a power operated cyclically operating machine of the type comprising a continuously running motor for supplying power to the machine, a power transmission element rotatable idly by the motor when the machine is at rest, a magnetic clutch comprising an inductive clutch winding for clutching the transmission element to the machine to drive it, and a magnetic brake comprising an inductive brake winding for braking the machine to stop it; the control comprising: a source of alternating current; a first and a second electronic tube rectifier connected to receive current from the source and supply it as unidirectional current to the clutch and brake windings respectively; a control system comprising electric circuits controlling the rectifiers, and actuable contacts controlling the circuits; the circuits being responsive to sequential actuation of the contacts to sequentially cause the first rectifier to act as a rectifier and energize the clutch winding, to act as an inverter to de-energize the clutch winding and to cause the second rectifier to act as a rectifier to energize the brake winding, and to act as an inverter to de-energize the brake winding and means for sequentially actuating the contacts.

WILLIAM FEW.
OSWALD M. BUNDY.

References Cited in the file of this patent

UNITED STATES PATENTS

| Number | Name | Date |
|---|---|---|
| 1,309,443 | Mascord | July 8, 1919 |
| 1,787,550 | Sorensim | Jan. 6, 1931 |
| 1,993,413 | Mellon | Mar. 5, 1935 |
| 2,065,820 | Mellon | Dec. 29, 1936 |
| 2,133,161 | Colbert | Oct. 11, 1938 |
| 2,299,007 | Bundy | Oct. 13, 1942 |
| 2,411,122 | Winther | Nov. 12, 1946 |